US010150553B2

(12) United States Patent
Cacciaguerra et al.

(10) Patent No.: US 10,150,553 B2
(45) Date of Patent: Dec. 11, 2018

(54) DEVICE AND METHOD FOR ASSEMBLING TWO SECTIONS OF AIRCRAFT FUSELAGE

(75) Inventors: Bruno Cacciaguerra, Aix en Provence (FR); Alain Depeige, Tournefeuille (FR); Jean-Claude Lacombe, Blagnac (FR); Hélène Cazeneuve, Fontenilles (FR); Marc-Antoine Castanet, Plaisance du Touch (FR)

(73) Assignee: AIRBUS OPERATIONS (Societe par Actions Simplifiee), Toulouse (FR)

( * ) Notice: Subject to any disclaimer, the term of this patent is extended or adjusted under 35 U.S.C. 154(b) by 0 days.

(21) Appl. No.: 13/533,266

(22) Filed: Jun. 26, 2012

(65) Prior Publication Data
US 2013/0181092 A1   Jul. 18, 2013

(30) Foreign Application Priority Data

Jun. 27, 2011   (FR) .................................... 11 55696

(51) Int. Cl.
*B64C 1/06* (2006.01)
*B64F 5/10* (2017.01)
*B64C 1/00* (2006.01)

(52) U.S. Cl.
CPC .............. *B64C 1/069* (2013.01); *B64C 1/068* (2013.01); *B64F 5/10* (2017.01); *B64C 2001/0081* (2013.01); *Y10T 29/49622* (2015.01)

(58) Field of Classification Search
CPC ........... B64C 1/06; B64C 1/061; B64C 1/064; B64C 1/068; B64C 1/069; B64C 1/10
USPC .................. 244/119, 120, 117 R, 131, 123.1
See application file for complete search history.

(56) References Cited

U.S. PATENT DOCUMENTS

| 3,920,206 | A  | * | 11/1975 | Bigham et al. | 244/132 |
| 5,518,208 | A  | * | 5/1996  | Roseburg | 244/132 |
| 5,806,797 | A  | * | 9/1998  | Micale | 244/120 |
| 5,893,534 | A  | * | 4/1999  | Watanabe | 244/119 |
| 7,823,362 | B2 | * | 11/2010 | Meyer | 52/713 |
| 8,215,584 | B2 | * | 7/2012  | Cazeneuve et al. | 244/131 |
| 8,220,745 | B2 | * | 7/2012  | Tacke | 244/131 |
| 8,302,909 | B2 | * | 11/2012 | Cazeneuve et al. | 244/120 |
| 8,336,820 | B2 | * | 12/2012 | Osorio et al. | 244/118.1 |

(Continued)

FOREIGN PATENT DOCUMENTS

FR   2 906 008 A1   3/2008
GB   524721         8/1940

OTHER PUBLICATIONS

French Preliminary Search Report dated Mar. 5, 2012 in Patent Application No. 1155696 (with English translation of Categories of Cited Documents).

*Primary Examiner* — Michael H Wang
(74) *Attorney, Agent, or Firm* — Oblon, McClelland, Maier & Neustadt, L.L.P.

(57) ABSTRACT

A device and method for assembling two aircraft fuselage sections each comprising a skin and longitudinal stiffeners, the device comprising fishplates fishing couples of mutually aligned longitudinal stiffeners belonging respectively to said sections, each fishplate comprising two fishplate pieces each comprising at least one longitudinal sole plate intended to be fixed to a longitudinal stiffener, and a transverse support head, and at least one demountable connecting member able to mutually clamp the respective support heads of said fishplate pieces to allow a transmission of longitudinal forces between these fishplate pieces.

16 Claims, 7 Drawing Sheets

(56) References Cited

U.S. PATENT DOCUMENTS

| | | | |
|---|---|---|---|
| 8,353,479 B2* | 1/2013 | Tacke et al. | 244/119 |
| 8,424,804 B2* | 4/2013 | Klaukien et al. | 244/119 |
| 8,453,975 B2* | 6/2013 | Dietrich et al. | 244/132 |
| 8,480,031 B2* | 7/2013 | Gauthie et al. | 244/120 |
| 8,484,848 B2* | 7/2013 | Gallant et al. | 29/897.2 |
| 8,490,920 B2* | 7/2013 | Karem | 244/119 |
| 8,517,309 B2* | 8/2013 | Robinson | 244/119 |
| 8,567,722 B2* | 10/2013 | Rosman et al. | 244/131 |
| 8,905,349 B2* | 12/2014 | Gross et al. | 244/119 |
| 2008/0067289 A1 | 3/2008 | Meyer | |

* cited by examiner

DEVICE AND METHOD FOR ASSEMBLING TWO SECTIONS OF AIRCRAFT FUSELAGE

TECHNICAL FIELD

The present invention relates to the assembly of various sections that make up the fuselages of aircraft, in particular aeroplanes, and which have a structure of the type comprising a skin and structural elements attached to the skin in order to confer its rigidity thereon, these elements typically comprising longitudinal stiffeners, also referred to as stringers, extending substantially in planes parallel to the axis of the fuselage, and circumferential frames, which extend overall in transverse planes, that is to say the planes extend in planes orthogonal to the axis of the fuselage, all around this axis.

The invention concerns in particular fuselages in which the longitudinal stiffeners are interrupted at junctions between sections of the fuselage and require to be fishplated to enable structural forces to be transmitted from one section of the fuselage to another.

PRIOR ART

FIG. 1 illustrates schematically a typical example of an aeroplane 10, the fuselage 12 of which is composed of several sections 14, 14a, 14b mounted end to end longitudinally and each formed from several panels mounted end to end circumferentially.

In the following description, the directions longitudinal, transverse and radial are defined with reference to the axis 15 of the fuselage 12 of the aeroplane.

As shown by FIG. 2, which illustrates two adjacent fuselage sections 14a, 14b, the panels 16a, 16b of these sections each comprise a skin 18a, 18b as well as several longitudinal stiffeners 20a, 20b that are interrupted close to the junction 22 between these two sections of fuselage.

FIG. 2a shows to a larger scale the detail IIa of FIG. 2, and thus illustrates the junction area between two respective adjacent panels 16a and 16b of the two adjacent fuselage sections 14a and 14b.

This FIG. 2a shows in particular two respective longitudinal stiffeners 20a and 20b of these fuselage sections, which are placed in alignment with each other, as well as a circumferential splice or barrel 24 directly connecting the respective skins 18a and 18b of the fuselage sections and thus participating in the transmission of the forces between these skins, and a fishplate 26 having one end 28a fixed to the stiffener 20a of the first panel 16a and an opposite end 28b fixed to the stiffener 20b of the second panel 16b. As is clear in FIG. 2a, the fishplate 26 also comprises a middle part 30 fixed to the circumferential splice 24. The fishplate 26 is fixed to the stiffeners 20a, 20b and to the splice 24 for example by bolts with nuts 32 of a type normally used in aircraft fuselages.

In the example shown, the longitudinal stiffeners 20a and 20b each comprise a middle wall 34, normally referred to as the web, which extends in the radial direction, and a sole plate 36 extending on either side of the web 34 tangentially to the skin 18a, 18b of the corresponding panel 16a, 16b and applied against this skin 18a, 18b. These longitudinal stiffeners thus have a T-shaped cross section.

It should be noted that it is sometimes desirable for the fishplates 26 to be fixed not only to the sole plate 36 but also to the web 34 of each of the stiffeners 20a, 20b, as in the example illustrated by FIG. 2a.

In general terms, the fixing of the fishplates to the stiffeners is normally effected by bolting or by other conventional techniques.

When they are assembled, the two fuselage sections 14a and 14b are positioned end to end, so that the splice 24, part of which has been previously fixed to a first of the sections 14a, has its other part fitted in the other section 14b, so that the longitudinal stiffeners 20a of the first section are substantially aligned with those 20b of the second section.

Next a fishplate 26 is fixed to each pair of aligned longitudinal stiffeners 20a, 20b so as to connect the two facing ends of the latter.

However, the manufacturing tolerances of the various elements and the assembly clearances do not allow perfect alignment of the longitudinal stiffeners of the fuselage sections. Mounting the fishplates on these stiffeners thus requires in the majority of cases deformations of these fishplates in order to make them coincide with the corresponding stiffeners. These deformations are difficult to implement and are liable to degrade the mechanical properties of the fishplates concerned.

In addition, fixing the fishplates by bolting on the longitudinal stiffeners requires a large number of tightening operations during the final phase of assembly of the fuselage sections, which presents a considerable cost.

In addition, the fuselages made from composite materials, which are more and more widespread at the present time, advantageously comprise longitudinal stiffeners having in cross section a shape in an omega. The stiffeners of this type, an example of which is illustrated in FIG. 3, comprise a middle stiffener body 38 connected on either side to two stiffener sole plates 36. In the particular example shown, the stiffener body 38 comprises two lateral flanks 34', normally referred to as webs, connected respectively to the two sole plates 36 by their base and connected to each other by a longitudinal wall 42 extending substantially parallel to the sole plates 36, and normally referred to as the stiffener head.

However, the alignment difficulties disclosed above prove to be particularly marked in the case of stiffeners in an omega shape.

DISCLOSURE OF THE INVENTION

The purpose of the invention is in particular to afford a simple, economical and effective solution to these problems, at least partly avoiding the aforementioned drawbacks.

The invention proposes for this purpose an assembly device for assembling two aircraft fuselage sections each comprising a skin as well as longitudinal stiffeners placed on this skin, the device comprising at least one fishplate intended for fishplating two longitudinal stiffeners substantially aligned with respect to each other and belonging respectively to said fuselage sections.

According to the invention, said fishplate comprises two fishplate pieces each comprising at least one longitudinal sole plate intended to be fixed to a corresponding longitudinal stiffener, and a transverse support head, and said fishplate also comprises at least one demountable connecting member able to mutually clamp the respective support heads of said fishplate pieces to allow a transmission of longitudinal forces between these fishplate pieces.

The aforementioned assembly device facilitates the fishplating of the longitudinal stiffeners, or stringers, of the fuselage sections, by allowing an adjustment of the alignment of the two fishplate pieces of each fishplate, before mutual clamping of these by each demountable connecting member of the fishplate.

By means of their respective support heads, the two fishplate pieces allow not only the transmission of longitudinal traction forces but also the transmission of longitudinal compression forces. All the longitudinal forces can thus pass through said fishplate. Traction forces must be taken to mean forces induced by a load applied to at least one of the two fishplate pieces in a direction opposite to the other fishplate piece, whereas compression forces must be taken to mean forces induced by a load applied to at least one of the two fishplate pieces towards the other fishplate piece.

In addition, the fishplate pieces can be fixed or pre-fixed to the corresponding fuselage sections before the final phase of assembly thereof, which affords a reduction in the number of operations necessary during this final phase of assembling the fuselage sections, as will become clearer hereinafter.

It should be noted that each demountable connecting member of each fishplate preferably consists of a bolt with nut, for example of the type normally used in aircraft fuselages or more generally in aeronautics, but this connecting member may be of any other type when this has an advantage.

The support head of each fishplate piece of each fishplate preferably forms a longitudinal end of the fishplate.

Such a configuration allows simple and efficient transmission of longitudinal compression forces.

As a variant, the support head of each fishplate piece of each fishplate may extend at a distance of the longitudinal ends of the fishplate piece. In this case, the demountable connecting member of the fishplate preferably comprises means for exerting, on each fishplate piece, a longitudinal force oriented in a direction opposite the other fishplate piece.

The fishplate pieces of each fishplate are preferably produced from a metal, and may in this case also be referred to as "metal brackets".

Moreover, each fishplate piece preferably comprises a web, that is to say a wall extending in a plane inclined or orthogonal to each sole plate of the fishplate piece. This web reinforces the rigidity of the fishplate piece.

The invention also concerns an assembly comprising two aircraft fuselage sections assembled end-to-end longitudinally and each of which comprises a skin as well as longitudinal stiffeners fixed to the skin and distributed around a longitudinal axis of the section, said longitudinal stiffeners being arranged so that each longitudinal stiffener of one of the sections is substantially aligned with a corresponding longitudinal stiffener of the other section, this assembly also comprising at least one assembly device of the type described above, wherein the respective transverse support heads of the fishplate pieces of each fishplate are clamped to each other by each demountable connecting member of the fishplate and wherein the respective longitudinal sole plates of said fishplate pieces of each fishplate are fixed respectively to two corresponding longitudinal stiffeners substantially aligned with each other and respectively forming part of the aforementioned fuselage sections.

Each fuselage section of the aforementioned assembly can be formed by several panels mounted end to end circumferentially and each comprising a part of the skin and some of the stiffeners of this fuselage section.

In a variant, each fuselage section can of course be produced in the form of a single annular panel without departing from the scope of the invention.

In addition, the fuselage sections advantageously comprise elements, such as skins, produced from a composite material.

Preferentially, at least one element of a circumferential frame is interposed between the respective transverse support heads of said fishplate pieces of each fishplate of said assembly device.

This element of the aforementioned circumferential frame is thus clamped between the two respective support heads of the fishplate pieces of each fishplate by means of each connecting member of the fishplate.

In addition, this element of the frame preferably has each connecting member of each fishplate passing through it.

The aforementioned circumferential frame may be of the integral type, that is to say comprising a foot and a web produced in a single piece, in which case the element interposed between the fishplate pieces is preferably the web of this frame.

As such an integral frame is for example of the type with T-shaped cross section, that is to say the foot of the frame takes the form of a sole plate extending on either side of the web of the frame, typically symmetrically with respect to the web.

In a variant, the frame may be of a type comprising independent connecting elements, sometimes referred to as clips, providing the connection of the web of the frame to the skin of at least one of the fuselage sections, in which case it is these connecting elements or clips that are preferably interposed between the fishplate pieces of each fishplate.

In a preferred embodiment of the invention, the aforementioned element of the circumferential frame comprises a foot interposed between at least a part of each sole plate of at least one of said fishplate pieces of each fishplate and the skin of the corresponding fuselage section.

The aforementioned foot of the frame advantageously has longitudinal grooves in which there are housed respective ends of sole plates of longitudinal stiffeners interposed between the foot of the frame and the skin of the fuselage section.

Moreover, each sole plate of each fishplate piece of each fishplate advantageously comprises a recess delimiting a space for receiving the aforementioned frame foot.

In general terms, all the fuselage sections may also comprise a circumferential splice fixed to the respective skins of said fuselage sections, and on which there is fixed a part of each sole plate of each fishplate piece of each fishplate of the aforementioned assembly device.

Such a splice allows the transmission of forces directly from the skin of one of the fuselage sections to that of the other fuselage section, in a manner known per se.

When the set of fuselage sections comprises a frame of the integral type with a T-shaped cross section as described above, the foot of the frame may be fixed to the respective skins of the fuselage sections so as to fulfil the function of a splice, and thus make the use of such a splice superfluous.

In general terms, each longitudinal sole plate of each fishplate piece is preferably, at least partly, fixed to a sole plate of at least one corresponding longitudinal stiffener.

In addition, the web of each of the fishplate pieces is advantageously fixed to a web of a corresponding longitudinal stiffener.

In a variant, the web of each of the fishplate pieces may be free, that is to say not be fixed to the corresponding stiffener.

Moreover, each fishplate piece of each fishplate preferably comprises a single sole plate that covers two respective contiguous sole plates of two circumferentially consecutive longitudinal stiffeners of the corresponding fuselage section.

In a variant, each of said longitudinal stiffeners comprising two sole plates circumferentially separated from each other and mutually connected by a body of the stiffener, each fishplate piece of each fishplate may comprise two sole plates respectively fixed to said two sole plates of a corresponding longitudinal stiffener and connected to each other by said transverse support head of the fishplate piece.

In general terms, each of said longitudinal stiffeners preferably has, in transverse section, an omega-shaped structure.

The use of stiffeners of this type is particularly advantageous when the skins of the fuselage sections are produced from a composite material.

In this case, the heads of each longitudinal stiffener may advantageously have, in each of their end edges, a scallop open in the longitudinal direction.

Such a scallop makes it possible where applicable to provide easy access to fastening elements used to fix the webs of each longitudinal stiffener to the respective webs of the corresponding fishplate pieces, and therefore to facilitate the installation, inspection and if necessary repair of these fastening elements.

In a variant, each of said longitudinal stiffeners may have, in transverse section, a T structure, that is to say comprising a web extending radially and a sole plate extending tangentially, on either side of the web.

In this case, two fishplate pieces may be fixed on either side of the web of each of said longitudinal stiffeners, on the sole plate of the stiffener, and, optionally, also on the web of this stiffener.

The aforementioned two fishplate pieces may also comprise respective projecting end parts applied one against the other, and fixed to each other, for example by bolts or rivets.

The invention also concerns an aircraft fuselage comprising at least one set of fuselage sections of the type described above.

It also concerns an aircraft comprising a fuselage of the type described above.

The invention finally concerns a method of assembling two aircraft fuselage sections, each of which comprises a skin as well as longitudinal stiffeners fixed to said skin and distributed around a longitudinal axis of the section, by means of at least one assembly device of the type described above, in particular in order to obtain a set of fuselage sections of the type described above, this method comprising at least steps of:

end-to-end positioning, in the longitudinal direction, of the respective skins of said fuselage sections;
fixing a first fishplate piece of each fishplate of said assembly device to a corresponding stiffener of a first one of said fuselage sections;
fixing the second fishplate piece of each fishplate of said assembly device to a corresponding stiffener of the second of said fuselage sections;
and, subsequently to the above three steps, mutual clamping of the respective transverse support heads of said fishplate pieces of each fishplate of said assembly device by means of each demountable connecting member of the fishplate.

The first three aforementioned positioning and clamping steps can be implemented in the order indicated above or, in a variant, in a different order.

In all cases, the configuration of each fishplate in two fishplate pieces able to move independently of each other enables the alignment of these fishplate pieces to be adjusted, which constitutes a considerable advantage when the two fuselage sections are assembled. This makes it possible in particular to avoid having to deform the fishplates in order to compensate for any alignment defects and/or to have to place adjustment shims on the webs of the stiffeners.

In a preferred embodiment of the invention, the aforementioned step of fixing the first fishplate piece of each fishplate is implemented before said step of end-to-end positioning of the skins of the fuselage sections.

In this way, the number of fixing operations during the final phase of assembly of the fuselage sections, that is to say subsequently to the step of end-to-end positioning of the skins of these fuselage sections, can be considerably reduced.

In addition, the step of fixing the second fishplate piece of each fishplate can also be implemented before the step of end-to-end positioning of the skins of the fuselage sections.

In this case, this step of fixing the second fishplate piece is advantageously implemented at the same time as the aforementioned step of fixing the first fishplate piece of each fishplate, that is to say according to a concurrent operating mode.

The implementation of the step of fixing the second fishplate piece of each fishplate before the step of end-to-end positioning of the fuselage sections further reduces the number of fixing operations during the final phase of assembly of the fuselage sections, when the requirements for adjustment of the alignment of the fishplate pieces are reduced.

In a variant, the step of fixing the second fishplate piece of each fishplate can be implemented after the step of end-to-end positioning of the skins of the fuselage sections.

This is advantageous for keeping good possibilities of adjustment of the alignment of the fishplate pieces of each fishplate, as explained above.

In this case, the method also advantageously comprises a step of provisional fixing of the second fishplate piece of each fishplate of the assembly device on the corresponding longitudinal stiffener of the second of said fuselage sections, implemented before said step of end-to-end positioning of the skins of the fuselage sections.

Provisional fixing means incomplete tightening of the fixing means, such as conventional bolts with nuts, which will be used subsequently for the definitive fixing of the aforementioned second fishplate pieces, or temporary fixing by provisional fixing means, such as pins, which will be removed subsequently with a view to the definitive fixing by other fixing means, which may there also consist of conventional bolts with nuts.

In general terms, it should be noted that the assembly method may include the mounting of a circumferential frame and/or a splice for connecting the skins of the fuselage sections.

BRIEF DESCRIPTION OF THE DRAWINGS

The invention will be better understood, and other details, advantages and features thereof will appear from a reading of the following description given by way of non-limitative example and with reference to the accompanying drawings, in which.

In all these figures, identical references may designate identical or similar elements.

DETAILED DISCLOSURE OF PREFERRED EMBODIMENTS

Figure 4:
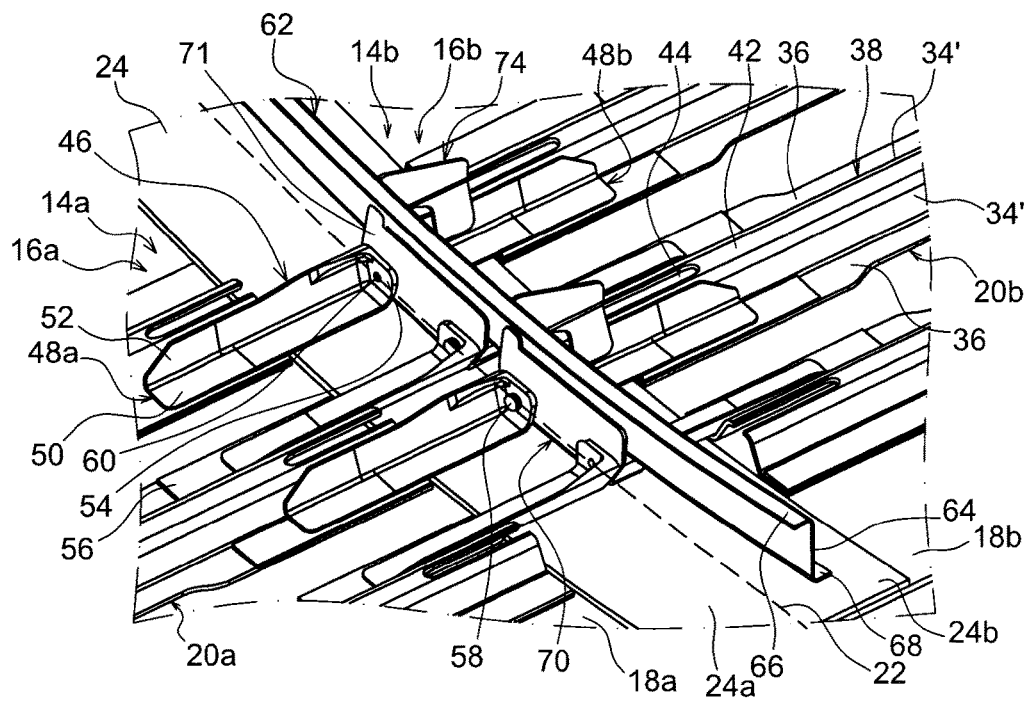
FIG. 4 is a partial schematic view in perspective of an aeroplane fuselage according to a first preferred embodiment of the invention, illustrating more particularly the junction area of two adjacent sections of this fuselage.
Figure 5:
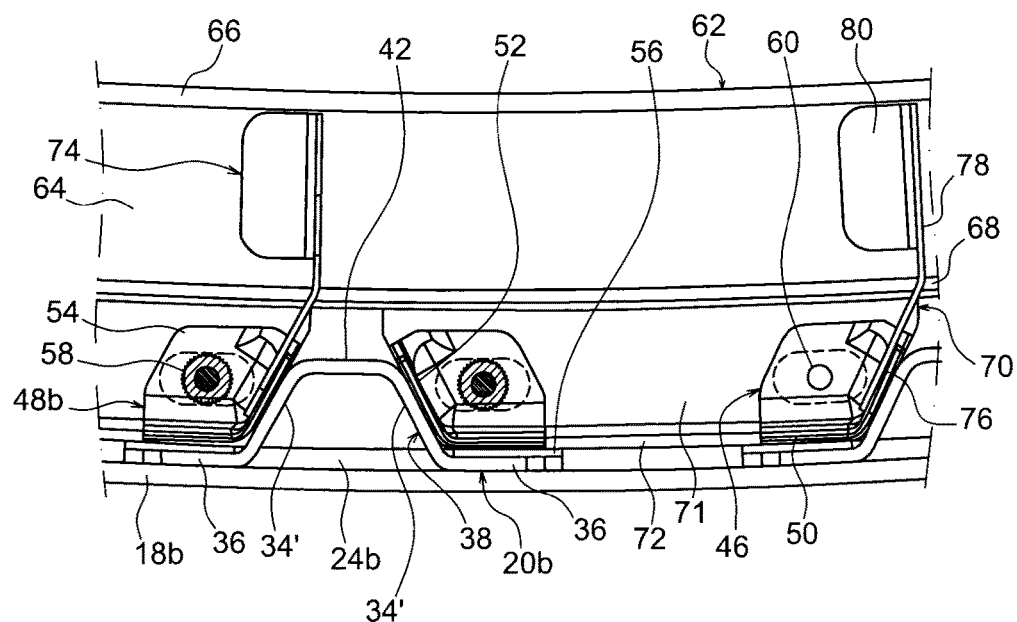
FIG. 5 is a partial schematic view, in the longitudinal direction, of the fuselage sections of FIG. 4.

FIGS. 4 and 5 illustrate the junction area of two adjacent sections 14a and 14b of an aircraft fuselage according to a first preferred embodiment of the invention.

Each of the sections 14a and 14b of this fuselage is formed by several panels 16a, 16b mounted end to end circumferentially and each comprising a skin 18a, 18b as well as longitudinal stiffeners or stringers 20a, 20b.

As shown by FIG. 4, the longitudinal stiffeners 20a, 20b are of the type in an omega shape and each comprises a middle stiffener body 38 comprising two lateral flanks or webs 34', the respective radially external ends of which are connected respectively to two stiffener sole plates 36 and the respective radially internal ends of which are connected to each other by a longitudinal wall forming a stiffener head 42, the longitudinal ends of which each have a scallop 44.

Moreover, the skins 18a, 18b of the panels 16a, 16b are connected structurally by a splice 24, in a manner known per se. It should be noted that the longitudinal end of the sole plates 36 of the stiffeners 20a, 20b come substantially in abutment against the corresponding edge of the splice 24.

As is clear in FIG. 4, each pair of mutually aligned stiffeners belonging respectively to the fuselage sections 14a and 14b is associated with a fishplate 46 comprising two independent fishplate pieces 48a and 48b, also referred to as metal brackets.

Each of these fishplate pieces 48a, 48b comprises a sole plate 50 extending longitudinally, a web 52 that extends longitudinally in a plane inclined with respect to the sole plate 50 and is connected to this sole plate 50, and a support head 54 extending transversely at a longitudinal end of the fishplate piece.

The sole plate 50 and the web 52 of each fishplate piece are conformed so as to be able to match a sole plate 36 of a stiffener 20a, 20b as well as the stiffener web 34' that is connected to it, and thus enables part of the sole plate 50 and of the web 52 of the fishplate piece to be fixed respectively to the corresponding stiffener sole plate 36 and web 34', for example by bolts with nuts (not shown in FIGS. 4 and 5). The sole plate 50 and the web 52 thus have substantially the same relative inclination as the inclination between the corresponding stiffener web 34' and sole plate 36.

Each fishplate piece 48a, 48b is applied partly to the corresponding stiffener 20a, 20b, and partly to the splice 24. Lifting shims 56 are interposed optionally between each fishplate piece 48a, 48b and the corresponding stiffener sole plate 36 so as to compensate for the difference in thickness between this stiffener sole plate 36 and the splice 24. These shims are for example produced from a composite material.

In addition, each fishplate 46 comprises a connecting bolt with nut 58 wherein the bolt is mounted in a through orifice 60, of longitudinal axis, formed in the support head 54 of each fishplate piece 48a, 48b of the fishplate so as to provide mutual clamping of the respective support heads 54 of these fishplate pieces 48a, 48b. Some fishplates 46 are shown without bolts with nuts 58 in FIGS. 4 and 5 in order to reveal the orifices 60 of these fishplates.

It should be noted that all the fishplates 46 form a device for assembling the two fuselage sections 14a and 14b, according to the terminology of the present invention.

The fuselage also comprises a circumferential frame 62 taking the form of a web 64 extending substantially in a transverse plane and having end edges 66 and 68 curved respectively in the direction of the front and rear of the fuselage.

The frame 62 is supported by connecting elements 70, also referred to as clips, each taking the form of a transverse plate 71 fixed to one side of the web 64 of the frame 62, for example by bolting, and comprising a foot 72 (FIG. 5) curved in the axial direction and fixed to the splice 24 and to the skin 18b of one 14b of the fuselage sections, for example by bolts with nuts (not visible in FIGS. 4 and 5).

It should be noted that each fishplate piece 48b fixed to the aforementioned fuselage section 14b comprises in its sole plate 50 a recess (not visible in FIGS. 4 and 5) that is formed on the face of the sole plate opposite to the web 52 of this fishplate piece, that is to say on the face opposite the splice 24, and which extends from the support head 54 thereof. This recess delimits a space for receiving the foot 72 of the corresponding clip 70 between the splice 24 and the sole plate 50 of the fishplate piece 48b. By way of example, this recess can define a step on the aforementioned face of the sole plate 50.

In addition, the frame 62 is supported by frame stabilisers 74 fixed to the other side of the web 64 of the frame and intended to limit the risks of tipping of this frame, in a manner known per se. Each frame stabiliser 74 takes the form of a blade (FIG. 5) extending parallel to the axis of the fuselage and comprising a first part 76 extending parallel to the aforementioned webs 52 and 34', as well as a second part 78 extending in a plane passing through the axis of the fuselage and provided with a curved part in a right angle forming a support head 80.

The first part 76 of each frame stabiliser 74 is fixed conjointly to the web 52 of a fishplate piece 48b and to the corresponding stiffener web 34' while the support head 80 of the frame stabiliser 74 is fixed to the web 64 of the frame 62.

As shown in FIG. 4, a part of each clip 70 is interposed between the respective support heads 54 of the fishplate pieces 48a, 48b of two fishplates 46 that are respectively fixed to two facing sides of two consecutive pairs of aligned longitudinal stiffeners 20a, 20b. Each clip 70 thus comprises two orifices that have the bolts of the connecting bolts with nuts 58 of the aforementioned two fishplates 46 passing through them, and which therefore allow a conjoint clamping of the clip 70 and the support heads 54 of the fishplate pieces 48a, 48b of these two fishplates 46, by means of the connecting bolts with nuts 58.

In general terms, the support head 54 of each fishplate piece 48a, 48b of each fishplate 46 is able to transmit longitudinal traction forces to the corresponding bolt with nut 58, which in turn is able to transmit these forces to the support head 54 of the other fishplate piece of the fishplate 46. Moreover, longitudinal compression forces can be transmitted from one fishplate piece of each fishplate 46 to the other fishplate piece thereof by reciprocal leaning of the respective support heads 54 of said fishplate pieces on each other, through the corresponding clip 70.

The assembly of the two fuselage sections 14a and 14b can be implemented according to the following method.

First, a number of fishplates 46 equal to twice the number of longitudinal stiffeners 20a, 20b of one or other of the fuselage sections 14a, 14b are made available.

A first circumferential part 24b of the splice 24 is fixed to the skin 18b of the panel 16b of a first 14b of the fuselage sections, for example by bolting, so that a second circumferential part 24a of this splice 24 extends freely beyond this section 14b.

The frame 62 is then installed by fixing the foot 72 of each clip 70 on the first part 24b of the splice 24 on the one hand, and fixing the transverse plate 71 of each clip 70 to the web 64 of the frame on the other hand.

A first fishplate piece 48b of each fishplate 46 is then fixed, for example also by bolting, to a corresponding sole plate 36 and web 34' of a stiffener 20b of the first fuselage section 14b and to the first circumferential part 24b of the splice 24 previously fixed to this first fuselage section 14b, ensuring firstly that the feet 72 of the clips 70 are inserted in the recess formed in the sole plate 50 of each fishplate 48b, and secondly that the orifices of each clip 70 and the respective orifices 60 of the support heads 54 of the fishplate 48b are aligned.

The frame stabilisers 74 are then fixed to the web 64 of the frame 62 and to the webs 34' of the stiffeners 20b of the first fuselage section 14b.

In parallel to the operations described above relating to the first fuselage section 14b, a second fishplate piece 48a of each fishplate 46 is pre-fixed to a corresponding sole plate 36 and web 34' of a stiffener 20a of the second fuselage section 14a. Pre-fixing means that each second fishplate piece is fixed temporarily to the corresponding stiffener 20a by fixing means, such as bolts with nuts, without complete tightening of the latter, so as to preserve mobility and clearance between the second fishplate piece and the stiffener. In a variant, this pre-fixing can be effected by temporary fixing means such as pins. In a variant again, this step of pre-fixing each second fishplate piece can be omitted.

In general terms, it should be noted that the scallop 44 of the head 42 of each stiffener 20a, 20b affords easy access to the internal face of the webs 34' of the stiffener and thus facilitates the operations described above of tightening the bolts with nuts ensuring the fixing of the fishplate pieces 48a, 48b on the webs 34' of the stiffeners, but also any subsequent inspection and repair operations.

The method next comprises the assembly proper of the fuselage sections 14a and 14b. It is then a case of positioning these two sections end to end, by ensuring alignment between the stiffeners 20b of the first section 14b and the stiffeners 20a of the second section 14a, and ensuring that the second circumferential part 24a of the splice 24 is fitted in the second fuselage section 14a, between the skin 18a of each panel 16a of this second fuselage section and the fishplate pieces 48a pre-fixed to the stiffeners 20a of this second fuselage section 14a.

The second circumferential part 24a of the splice 24 can then be fixed to the skin 18a of each panel 16a of the second section 14a, for example by bolting.

The second fishplate piece 48a of each fishplate 46 previously pre-fixed may, if necessary, be moved relative to the corresponding stiffener 20a of the second section 14a so as to obtain satisfactory alignment of the orifice 60 in the support head 54 of this second fishplate piece 48a with the corresponding orifice 60 in the first fishplate piece 48b of this fishplate 46 and the corresponding orifice in the clip 70 interposed between these two fishplate pieces 48a, 48b.

The respective connecting bolts 58 of the fishplates 46 can then be mounted in the orifices 60 in the respective support heads 54 of the two fishplate pieces 48a, 48b of each fishplate 46 and in the corresponding orifices in the clips 70, so as to clamp the aforementioned two fishplate pieces 48a, 48b conjointly with the corresponding clip 70.

Where the operation of pre-fixing the second fishplate piece 48a of each fishplate 46 has previously been omitted, the second fishplate pieces 48a are successively put in place on the corresponding stiffener 20a of the second fuselage section 14a and fixed respectively to the first associated fishplate pieces 48b by means of the connecting bolts with nuts 58, as described above.

The definitive fixing of each fishplate piece 48a to the corresponding stiffener 20a of the second section 14a and to the second part 24a of the splice 24 is carried out at this stage.

In the case where the operation of pre-fixing the second fishplate piece 48a of each fishplate 46 has been carried out in advance, and according to the type of pre-fixing, the aforementioned definitive fixing can consist of a complete tightening of the fixing means partially tightened in advance, or a replacement of temporary fixing means, such as pins, with definitive fixing means, such as bolts with nuts. Where the pre-fixing operation has been omitted, definitive fixing must be taken to mean a clamping operation by such definitive fixing means.

It is clear that the method described above by way of example not only facilitates the mounting of the fishplates 46 on the longitudinal stiffeners 20a, 20b by offering possibilities of adjusting the alignment between the fishplate pieces 48a and 48b during the phase of final assembly of the fuselage sections 14a, 14b, but this method also affords a reduction in the number of operations necessary subsequently to the connection of the two fuselage sections, since the first fishplate piece 48b of each fishplate 46 can be definitively fixed in advance to one of the fuselage sections 14b, all the more so in the case where the other fishplate piece 48a of each fishplate is partially fixed to the other fuselage section 14a.

Figure 6:
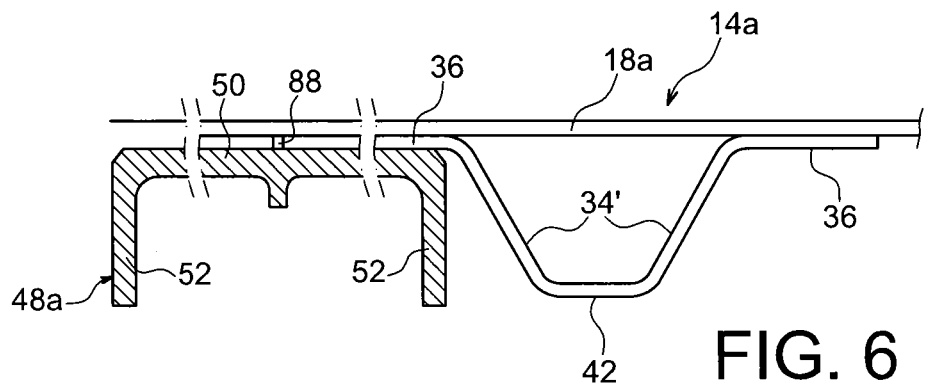
FIG. 6 is a partial schematic view in transverse section of an aeroplane fuselage according to a second preferred embodiment of the invention, illustrating more particularly the junction area of two adjacent sections of this fuselage.

FIGS. 6 to 9 illustrate a second preferred embodiment of the invention, in which the fishplate pieces 48a, 48b of each fishplate 46 each have a sole plate 50 fixed to and covering the contiguous sole plates 36 belonging respectively to two consecutive longitudinal stiffeners 20a, 20b of the corresponding fuselage section 14a, 14b (FIG. 6).

In addition, each fishplate piece 48a, 48b has two webs 52 formed respectively at the two opposite circumferential ends of the sole plate 50 of the fishplate piece, and extending substantially in a plane passing through the axis of the fuselage, that is to say in a direction perpendicular to the sole plate 50. In the example illustrated here, these webs 52 are free, that is to say they are not fixed to the corresponding stiffener webs 34'.

In addition, on each of the fuselage sections 14a, 14b, the two contiguous sole plates 36 of each pair of consecutive stiffeners 20a, 20b extend circumferentially so as to leave a small space between their ends, in which a seal 88 is housed (FIG. 6), for example produced from conventional mastic, which provides contact with the aforementioned two stiffener sole plates 36 and with the sole plate 50 of the corresponding fishplate piece 48a, 48b.

Moreover, the circumferential frame 62 is of the integral type with a T-shaped cross section, and thus comprises a frame foot 90 (FIG. 7) taking the form of a sole plate produced in a single piece with the web 64 of this frame and extending longitudinally on either side of this web 64. This frame foot 90 is fixed to the respective skins 18a, 18b of the panels 16a, 16b of the two fuselage sections 14a, 14b, for example by bolting, so as to fulfil the function of structural connection of the skins 18a, 18b that was devolved to the splice 24 in the first embodiment described above.

In a manner known per se, each longitudinal stiffener 20a, 20b (FIG. 8) has two sole plates 36 extending beyond the head 42 of the stiffener in the longitudinal direction. In addition, the webs 34' of each stiffener have at their longitudinal ends an edge 91 inclined with respect to the direction perpendicular to the sole plates 36 of the stiffener, so as to optimise the transmission of forces between the head 42 of the stiffener and the sole plates 36 of the latter.

Figure 7:
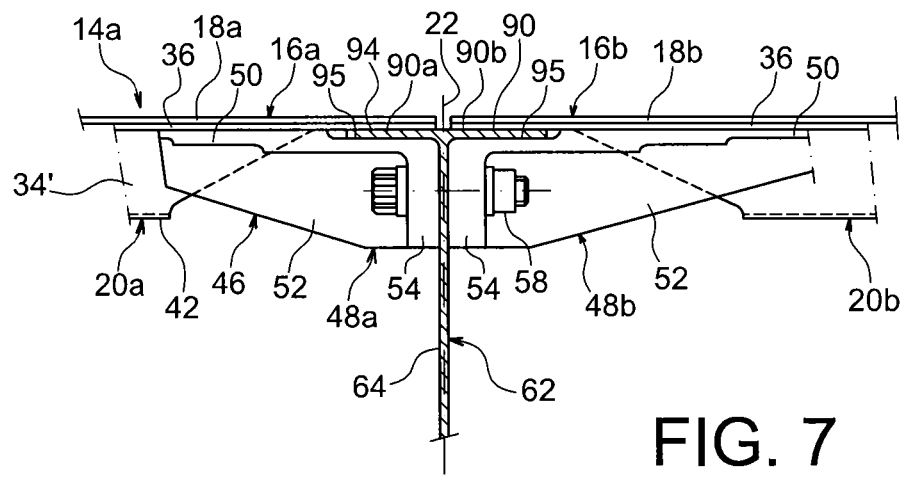
FIG. 7 is a partial schematic view in axial section of the fuselage of FIG. 6.
Figure 8:
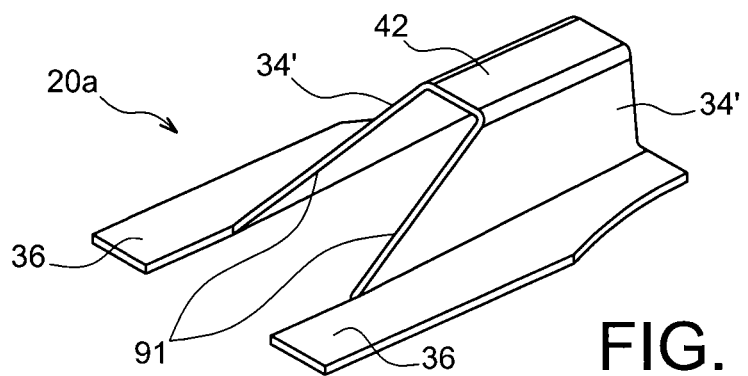
FIG. 8 is a partial schematic view in perspective of a longitudinal stiffener belonging to the fuselage of FIG. 6.
Figure 9:
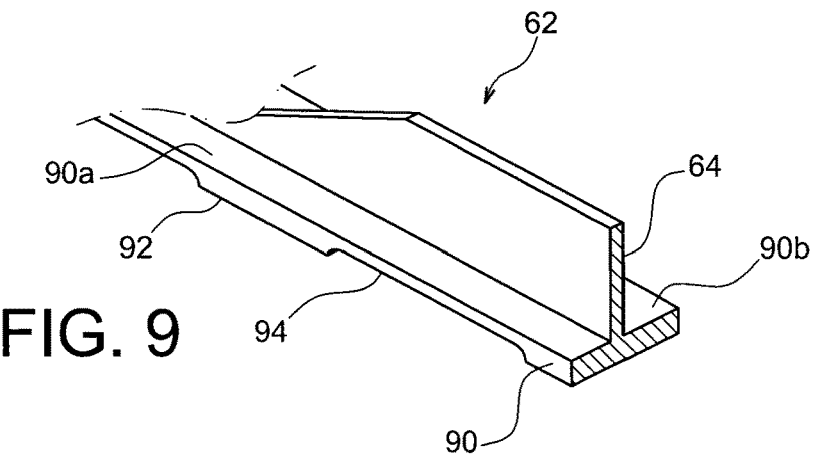
FIG. 9 is a partial schematic view in perspective of an integral circumferential frame with a T-shaped cross section belonging to the fuselage of FIG. 6.

As shown by FIG. 7, the sole plates 36 of each stiffener 20a, 20b extend longitudinally as far as the end of the corresponding fuselage section 14a, 14b.

Because of this, the frame foot 90 is fixed conjointly to the sole plates 36 of the stiffeners 20a, 20b, and to the aforementioned skins 18a, 18b.

In addition, the frame foot 90 comprises, on its face 92 opposite the skins 18a, 18b, grooves 94 (FIG. 9) regularly spaced apart around the axis of the fuselage and each of which enables two adjacent sole plates 36 belonging respectively to two consecutive stiffeners 20a, 20b to pass.

In addition, the two fishplate pieces 48a, 48b of each fishplate 46 comprise a recess 95 (FIG. 7) formed opposite the skin 18a, 18b of the panel 16a, 16b of the corresponding fuselage section 14a, 14b and extending from the support head 54 of the fishplate piece, in order to delimit a space for receiving the frame foot 90 between each of the fishplate pieces 48a, 48b of the fishplate and the corresponding stiffener sole plate 36.

It should be noted that, according to this second embodiment, each fishplate 46 comprises for example two or three connecting bolts with nuts 58 (FIG. 7) providing the mutual clamping of the respective support heads 54 of the two fishplate pieces 48a, 48b of the fishplate, said support heads 54 therefore each comprising two or three through orifices that enable the screws of these connecting bolts 58 to pass.

In addition, in this second embodiment of the invention, it is the web 64 of the frame 62 that is interposed between the respective support heads 54 of the fishplate pieces 48a, 48b of each fishplate 46. This web 64 of the frame 62 is therefore pierced with orifices provided for passage of the connecting bolts 58 of the fishplates 46.

The assembly of the two fuselage sections 14a and 14b can be implemented according to the following method.

First, a number of fishplates 46 equal to the number of longitudinal stiffeners 20a, 20b of one or other of the fuselage sections 14a, 14b is made available.

A first side 90a of the foot 90 of the frame 62 is fixed to the skin 18a of the panels 16a of a first 14a of the fuselage sections, for example by bolting, so that a second side 90b of this frame foot 90 extends freely beyond this section 14a.

A first fishplate piece 48a of each fishplate 46 is then fixed to two contiguous stiffener sole plates 36 of the first fuselage section 14a, where necessary after placing the seal 88 between these two stiffener sole plates 36, and on the first side 90a of the frame foot 90, for example also by bolting.

In parallel, a second fishplate piece 48b of each fishplate 46 can be pre-fixed to two contiguous stiffener sole plates 36 of the second fuselage section 14b. Pre-fixing should be taken to mean again that each second fishplate piece is fixed temporarily to the corresponding stiffener sole plates 36 by fixing means, such as bolts, without complete tightening of the latter, so as to preserve mobility and clearance between the second fishplate piece and the stiffener sole plates. In a variant, this pre-fixing can be effected by temporary fixing means such as pins. This pre-fixing step can also be omitted.

The method next comprises the assembly proper of the fuselage sections 14a and 14b. It is then a case of positioning these two sections end to end while ensuring alignment between the stiffeners 20a of the first fuselage section 14a and the stiffeners 20b of the second section 14b, and ensuring that this second side 90b of the frame foot 90 is fitted in the second fuselage section 14b, in the reception spaces defined between the stiffener sole plates 36 of this second fuselage section and the fishplate pieces 48b pre-fixed to these sole plates 36.

The second side 90b of the frame foot 90 can then, where applicable, be fixed to the skin 18b of each panel 16b of the second fuselage section 14b, for example by bolting.

The second fishplate piece 48b of each fishplate 46 can, if necessary, be moved relative to the corresponding stiffener sole plates 36 of the second fuselage section 14b so as to obtain satisfactory alignment of the two through orifices in the support head 54 of this second fishplate piece 48b with the corresponding two orifices in the first fishplate piece 48a of this fishplate 46 and the corresponding two orifices in the web 64 of the frame 62 that is interposed between these two fishplate pieces 48a, 48b.

The two connecting bolts 58 of each of the fishplates 46 can then be mounted in the orifices in the support heads 54, passing through the corresponding orifices in the web 64 of the frame 62, so as to clamp the two fishplate pieces 48a, 48b of each fishplate 46 conjointly with the frame 62.

The definitive fixing of each fishplate piece 48b to the corresponding stiffener 20b of the second section 14b and to the second side 90b of the frame foot 90 can also be effected at this stage. According to the previous steps, this definitive fixing can consist of a complete tightening of fixing means partially tightened previously, a replacement of temporary fixing means, such as pins, by definitive fixing means, such as bolts, or, when the step of pre-fixing of the second fishplate pieces 48b has been omitted, a direct tightening of such definitive fixing means.

Figure 10:
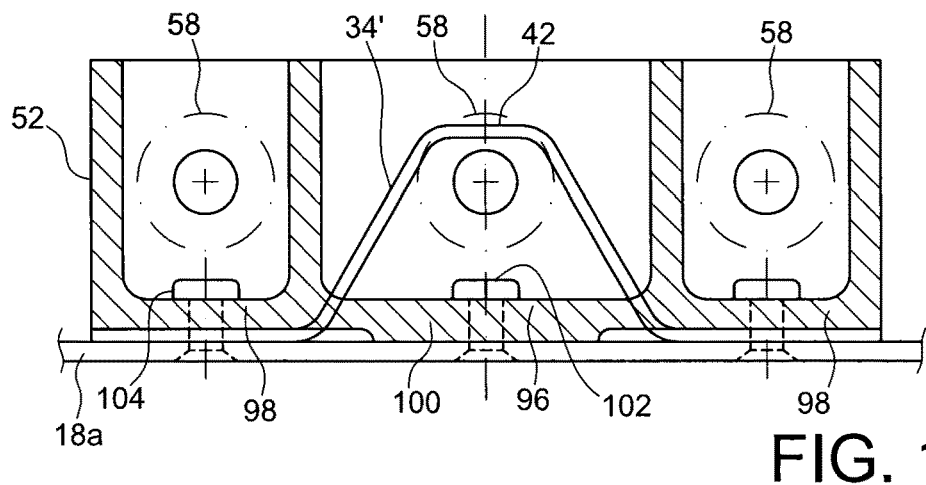
FIG. 10 is a partial schematic view, in the longitudinal direction, of an aeroplane fuselage according to a third preferred embodiment of the invention, illustrating in particular a longitudinal stiffener of this fuselage and an associated fishplate piece.
Figure 11:
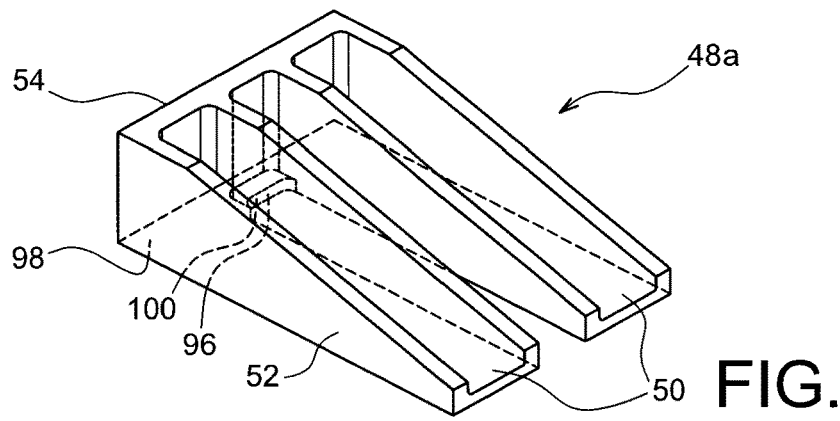
FIG. 11 is a partial schematic view in perspective of the fishplate piece of FIG. 10.
Figure 12:
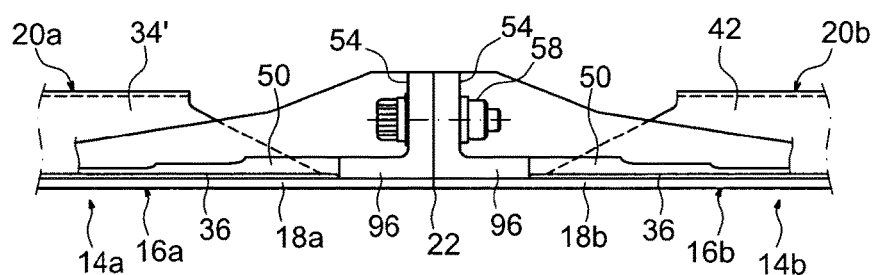
FIG. 12 is a partial schematic view in axial section of the fuselage of FIG. 10, illustrating more particularly the junction area of two adjacent sections of this fuselage.

FIGS. 10 to 12 illustrate a third preferred embodiment of the invention, in which the fishplate pieces 48a, 48b of each fishplate 46 each have two lateral sole plates 50 that are respectively fixed to the two sole plates 36 of the same corresponding longitudinal stiffener 20a, 20b.

More precisely, each fishplate piece 48a, 48b has a support head 54, taking the form of a transverse plate having a circumferential extent substantially equal to the circumferential extent of a longitudinal stiffener 20a, 20b, as well as a foot 96 formed at the base of the support head 54 and extending substantially orthogonally to the latter.

The foot 96 has two lateral parts 98 that are extended, in the direction opposite to the support head 54, respectively by the aforementioned two lateral sole plates 50. The foot 96 also has a middle part 100 (FIG. 10) that has a protrusion extending between the sole plates 36 of the corresponding stiffener 20a, 20b so as to be in contact with the panel skin 18a, 18b on which the aforementioned stiffener 20a, 20b is fixed.

It should be noted that the middle part 100 of the foot 96 is fixed to the panel skin 18a, 18b by a bolt 102, like the lateral sole plates 50 that are fixed conjointly to the skin 18a, 18b and to the sole plates 36 of the stiffener 20a, 20b by bolts (one of which 104 is visible in FIG. 10).

In addition, each fishplate piece 48a, 48b has four webs 52 formed respectively at the two opposite circumferential ends of each of the two sole plates 50 of the fishplate piece, and extending substantially in a plane passing through the axis of the fuselage, that is to say a plane orthogonal to the sole plates 50 and to the support head 54 of the fishplate piece. Each of these webs 52 is connected to the support head 54 and has, in the direction perpendicular to the sole plates 50, an extent that decreases on moving away from the support head 54 (FIG. 11). In the example illustrated here, all the webs 52 are free, that is say they are not fixed to the corresponding stiffener webs 34' (FIG. 10).

The respective support heads 54 of the two fishplate pieces 48a, 48b of each fishplate 46 are moreover clamped against each other by means of three connecting bolts 58 (FIGS. 10 and 12).

Seals can also be provided between contiguous sole plates 36 of consecutive stiffeners 20a, 20b, and/or between the sole plates 36 of the stiffeners and the sole plates 50 of the fishplate pieces 48a, 48b.

It should be noted that, in the example described in FIGS. 10 to 12, there is no circumferential frame at the junction 22 between the fuselage sections 14a and 14b. It is however possible to provide a circumferential frame at this junction, in which case the fishplate pieces 48a, 48b can comprise a recess similar to that in the fishplate pieces of the second embodiment in FIGS. 6 to 9 described above.

The assembly of the fuselage sections 14a, 14b, according to this third embodiment of the invention, can be effected in a particularly simple manner, in particular in the absence of a frame and splice.

Thus this method can consist of providing a number of fishplates 46 equal to the number of stiffeners of one or other of the fuselage sections 14a and 14b, fixing a first fishplate piece 48a of each fishplate to a corresponding stiffener 20a of a first 14a of the fuselage sections, if applicable pre-fixing the second fishplate piece 48b of each fishplate to a corresponding stiffener 20b of the second fuselage section 14b, and then positioning the two fuselage sections end to end while ensuring that the stiffeners 20a of the first section 14a are aligned with the stiffeners 20b of the second section 14b, and finally if necessary adjusting the position of the aforementioned second fishplate pieces 48b, and mutually clamping the respective support heads 54 of the two fishplate pieces 48a, 48b of each fishplate 46 by means of the three connecting bolts 58 of the fishplate, and definitively fixing the aforementioned second fishplate pieces 48b.

Figure 1:
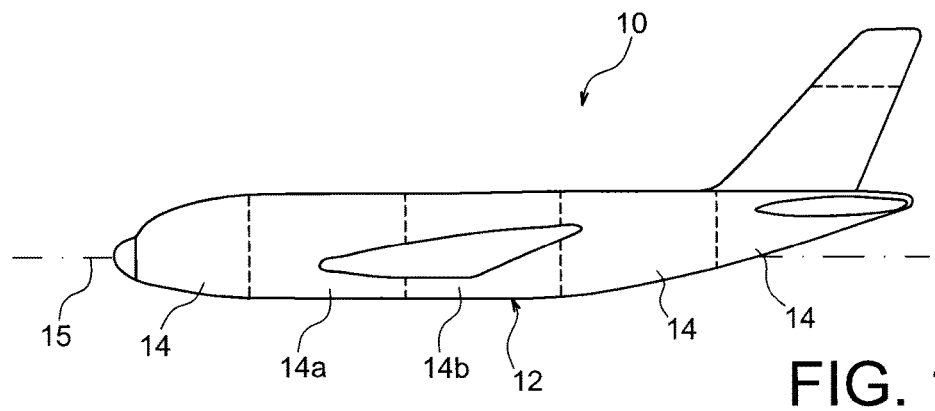
FIG. 1, already described, is a partial schematic side view of an aeroplane of a known type.
Figure 2:
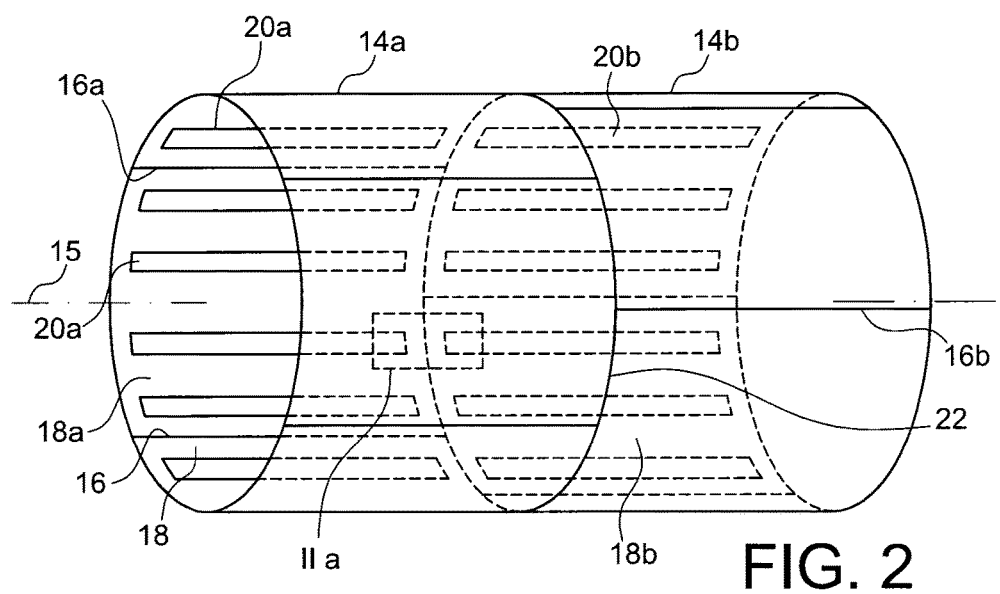
FIG. 2, already described, is a partial schematic view in perspective of two adjacent sections of the fuselage of the aeroplane of FIG. 1.
Figure 2A:
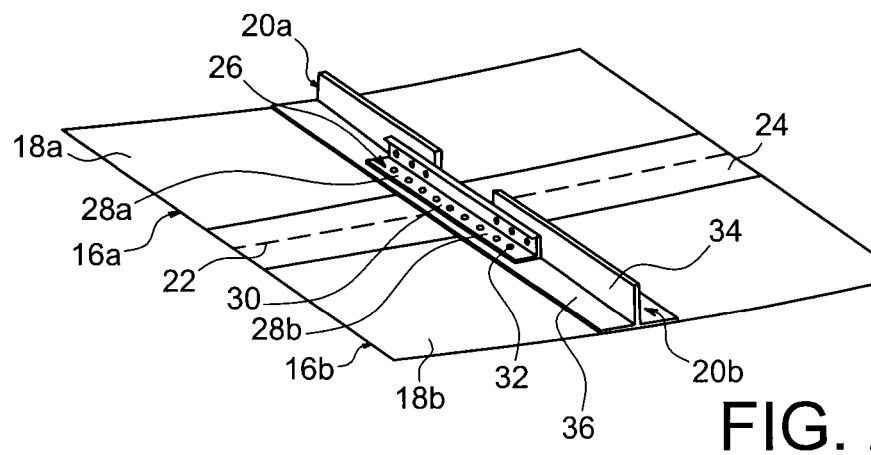
FIG. 2a, already described, is a view to a larger scale of the detail IIa of FIG. 2.
Figure 3:
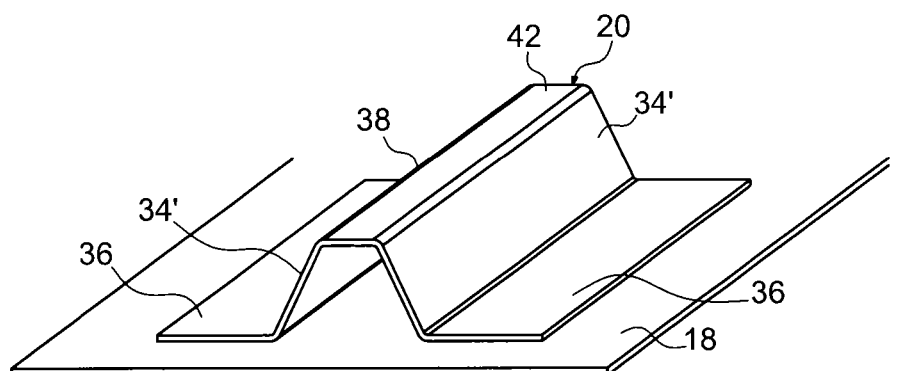
FIG. 3, already described, is a partial schematic view in perspective of a longitudinal stiffener with an omega-shaped cross section.
Figure 13:
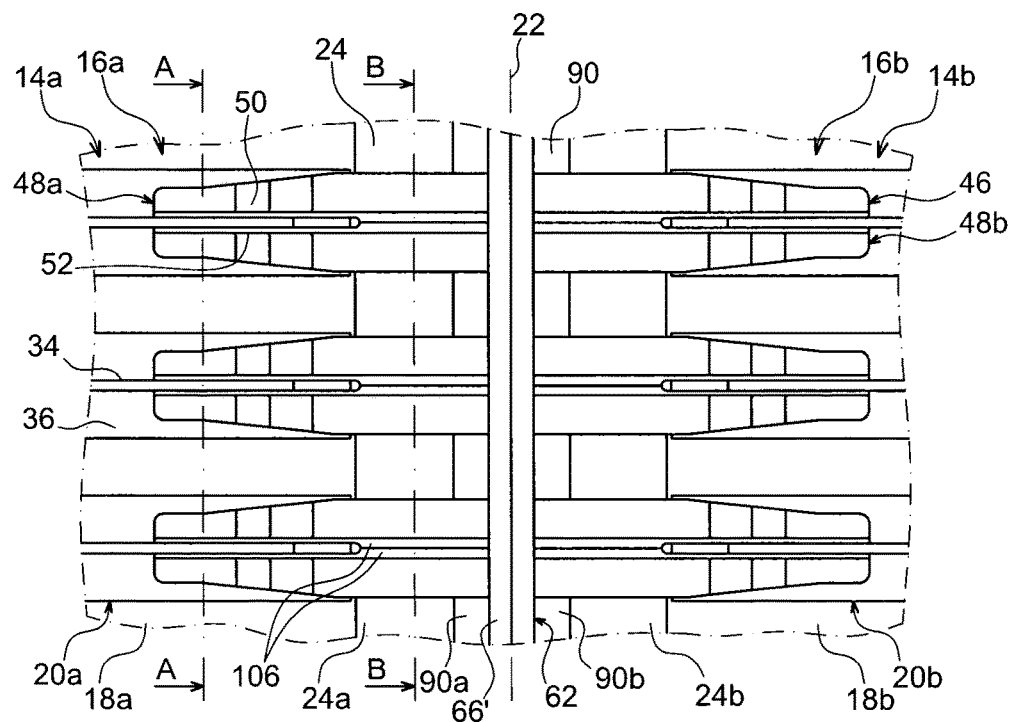
FIG. 13 is a partial schematic view, in the radial direction and from the inside, of an aeroplane fuselage according to a fourth preferred embodiment of the invention, this view illustrating more particularly the junction area of two adjacent sections of this fuselage.
Figure 14:
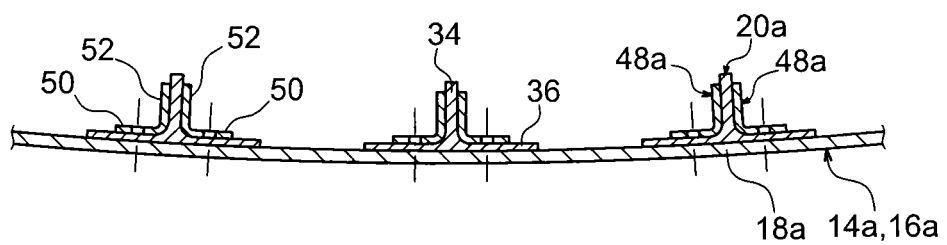
FIG. 14 is a partial schematic view in transverse section along the plane A-A in FIG. 13, of the fuselage in this FIG. 13.
Figure 15:
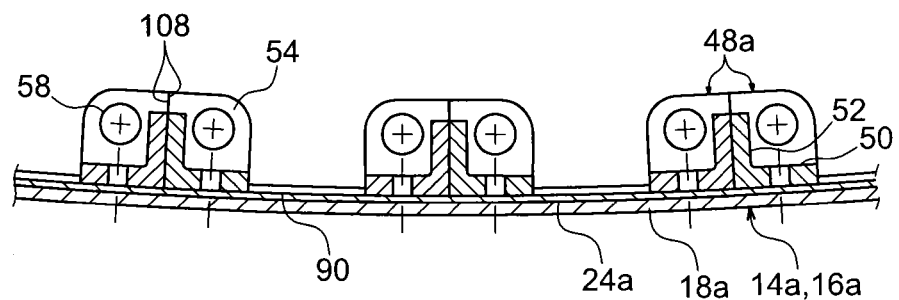
FIG. 15 is a partial schematic view in transverse section along the plane B-B in FIG. 13, of the fuselage in this FIG. 13.

FIGS. 13 to 15 illustrate a fourth preferred embodiment of the invention, in which the stiffeners 20a, 20b are stiffeners with a T-shaped cross section of the same type as those in FIG. 2a described above, and the fishplates 46 are roughly similar to the fishplates of the first embodiment in FIGS. 4 and 5 described above.

In this fourth embodiment, each pair of aligned stiffeners 20a, 20b belonging respectively to the two fuselage sections 14a, 14b are connected to each other by two fishplates 46 placed on either side of the web 34 of each of these stiffeners.

In the example shown, the fuselage comprises a circumferential frame 62 of the integral type with an I-shaped cross section. This frame thus comprises a foot 90 in the form of a sole plate extending on either side of the web of the frame from the radially internal end thereof, and a circumferential head 66' also extending on either side of the web of the frame, from the radially external end thereof.

In this example, the foot 90 of the frame 62 is fixed to a splice 24 extending longitudinally beyond the foot 90 on either side of the junction 22 of the two fuselage sections 14a, 14b, and intended to secure the respective skins 18a, 18b of the panels 16a, 16 constituting the two fuselage sections 14a, 14b, like the splice 24 in FIG. 4.

Each fishplate piece 48a, 48b comprises, in the face of its sole plate 50 opposite to its web 34, a recess (not visible in FIGS. 13 to 15) extending from the support head 54 (FIG. 15) of the fishplate piece, and delimiting a space for receiving the foot 90 of the frame 62 between the splice 24 on the one hand and the sole plate 50 of the fishplate piece 48a, 48b on the other hand. This recess defines for example a step on the aforementioned face of the sole plate 50.

The sole plate 50 of each fishplate piece 48a, 48b is fixed to the sole plate 36 of a corresponding stiffener 20a, 20b in a similar manner to what was described above with reference to the first embodiment of the invention in FIGS. 4 and 5.

When necessary, lifting shims can also be interposed between the sole plate 36 of each stiffener 20a, 20b and the sole plate 50 of the corresponding fishplate piece 48a, 48b, as in the first embodiment of the invention.

Moreover, the two fishplate pieces 48a, 48b of each fishplate 46 are secured to each other by a bolt with nut 58 in a similar manner to what was described above with reference to FIGS. 4 and 5. More precisely, the web of the frame 62 is sandwiched between the respective support heads 54 of the two fishplate pieces 48a, 48b. The clamping of the assembly thus formed is provided by the bolt with nut 58 wherein the bolt is mounted in an orifice in the support head 54 of each of the two fishplate pieces 48a, 48b and passing through a corresponding orifice (not visible in FIGS. 13 to 15) that passes through the web of the frame 62.

In addition, the respective webs 52 of the fishplate pieces 48a, 48b placed on either side of the web 34 of the same stiffener 20a, 20b are fixed to this web 34 of the stiffener, for example by bolting or riveting.

The web 52 of each of these fishplate pieces 48a, 48b also comprises a protruding end part 106 extending from the support head 54 of the fishplate piece as far as the end of the web 34 of the stiffener 20a, 20b on which the fishplate piece is fixed. As shown in FIG. 13, the protruding end parts 106 of the respective webs 52 of these fishplates pieces 48a, 48b are applied against each other and fixed to each other by bolts, rivets or other suitable fixing means.

In a similar manner, the respective support heads 54 of the aforementioned fishplate pieces 48a, 48b are in contact through their adjacent lateral flanks 108 (FIG. 15).

The assembly of the two fuselage sections 14a and 14b can be effected in accordance with the following method.

First, a number of fishplates 46 equal to twice the number of longitudinal stiffeners 20a, 20b of one or other of the fuselage sections 14a, 14b is made available.

A first circumferential part 24a of the splice 24 is fixed to the skin 18a of the panel 16a of a first 14a of the fuselage sections, for example by bolting, so that a second circumferential part 24b of this splice 24 extends freely beyond this section 14a.

A first side 90a of the foot 90 of the frame 62 is fixed to the first circumferential part 24a of the splice 24, for example by bolting, so that a second side 90b of this frame foot 90 extends over the second circumferential part 24b of this splice 24.

Next, for each stiffener 20a of the first fuselage section 14a, two respective first fishplate pieces 48a of two fishplates 46 are fixed by their respective sole plates 50 to the sole plate 36 of the stiffener 20a, on either side of the web 34 of this stiffener, and are fixed by their respective webs 52 to the web 34 of the stiffener. In addition, these first two fishplate pieces 48a are fixed to each other by their respective protruding end parts 106.

Moreover, the second fishplate pieces 48b of each fishplate 46 can be pre-fixed in a similar manner to the second fuselage section 14b, in parallel to the operations concerning the first fuselage section 14a. Pre-fixing means, as explained above, that each second fishplate piece 48b is then fixed temporarily to the corresponding stiffener 20b by fixing means, such as bolts, without complete tightening of the latter, so as to keep mobility and clearance between the second fishplate piece and the stiffener. In a variant, this pre-fixing can be effected by temporary fixing means such as pins.

The method next comprises the assembly proper of the fuselage sections 14a and 14b, in which these two fuselage sections are positioned end to end, ensuring:
- alignment between the stiffeners 20a of the first section 14a and the stiffeners 20b of the second section 14b;
- the fitting of the second part 24b of the splice 24 in the second fuselage section 14b between the skin 18b of each panel 16b constituting said fuselage section 14b and the sole plate 50 of each second fishplate piece 48b pre-fixed to this fuselage section 14b;
- the fitting of the second side 90b of the frame foot 90 in the reception spaces defined between the sole plates 36 of the stiffeners 20b of the second fuselage section 14b and the aforementioned fishplate pieces 48b.

The second side 90b of the frame foot 90 can then, where necessary, be fixed conjointly on the second part 24b of the splice 24 and on the skin 18b of each panel 16b of the second fuselage section 14b, for example by bolting.

The second fishplate piece 48b of each fishplate 46 can, if necessary, be moved relative to the corresponding stiffener sole plate 36 of the second fuselage section 14b so as to obtain a satisfactory alignment of the bolt passage orifice formed in the support head 54 of this second fishplate piece 48b with the corresponding orifice in the first fishplate piece 48a of this fishplate 46 and the corresponding orifice in the web of the frame 62 interposed between these two fishplates pieces 48a, 48b.

The connecting bolt 58 of each of the fishplates 46 can then be mounted in the respective orifices of the support heads 54, passing through the corresponding orifice in the web of the frame 62, so as to clamp the two fishplate pieces 48a, 48b of each fishplate 46 conjointly with the frame 62.

The definitive fixing of each fishplate piece 48b on the corresponding stiffener 20b of the second section 14b and on the second side 90b of the frame foot 90 can also be effected at this stage. According to the previous steps, this definitive fixing may consist of a complete tightening of the fixing means partially tightened previously, or a replacement of the temporary fixing means, such as pins, with definitive fixing means such as bolts.

In general terms, it must be understood that features of the four embodiments described above can be combined in order to result in other embodiments without departing from the scope of the present invention.

For example, the fishplates 46 of the second embodiment (FIGS. 6 and 7) can be used at a junction of fuselage sections with no circumferential frame, as in the third embodiment described above, in which case the recess 95 in each fishplate piece is no longer useful and can therefore be omitted.

In addition, the fishplates 46 of the first embodiment (FIGS. 4 and 5) can comprise webs 52 that are free, that is to say not fixed to the webs of the longitudinal stiffeners, when this has an advantage.

Moreover, a frame of the type used in the first embodiment described above may optionally be used with the fishplates of the second or third embodiment by means of an adaptation of the configuration of these fishplates.

Likewise, a frame of the type used in the second embodiment described above may optionally be used with the fishplates of the first or third embodiment, by means also of an adaptation of the configuration of these fishplates.

It should be noted that, in general terms, in all these embodiments of the invention, the support head 54 of each fishplate piece 48a, 48b of each fishplate 46 is able to transmit longitudinal traction forces to the corresponding bolt with nut 58, which in turn is able to transmit these forces to the support head 54 of the other fishplate piece of the fishplate 46, whereas longitudinal compression forces can be transmitted from one fishplate piece of each fishplate 46 to the other fishplate piece thereof by reciprocal leaning of the respective support heads 54 of said fishplate pieces on each other.

The invention claimed is:

1. An assembly, comprising:
   two aircraft fuselage sections assembled end to end longitudinally and each of which comprises a skin as well as omega-shaped longitudinal stiffeners directly attached to said skin and distributed around a longitudinal axis of said section, said longitudinal stiffeners being arranged so that each longitudinal stiffener of one of the sections is substantially aligned with a corresponding longitudinal stiffener of the other section; and
   at least one assembly device comprising two fishplate elements for fishplating two longitudinal stiffeners and at least one demountable connecting member,
   wherein each of said fishplate elements comprises a longitudinal sole plate, a web, and a transverse support head, the two fishplate elements being separated from each other in a longitudinal direction by a circumferential frame, wherein each of the two longitudinal stiffeners include a sole plate and a web, wherein the respective transverse support heads of the two fishplate elements are clamped to each other by the demountable connecting member so as to allow a transmission of longitudinal tension and compression forces between the two fishplate elements, wherein the respective longitudinal sole plates of the two fishplate elements are directly attached respectively to respective sole plates of two corresponding longitudinal stiffeners substantially aligned with each other and respectively forming part of said fuselage sections, and wherein the respective webs of the two fishplate elements are directly attached respectively to respective webs of the two corresponding longitudinal stiffeners.

2. The assembly according to claim 1, wherein at least one element of the circumferential frame is interposed between the respective transverse support heads of the two fishplate elements.

3. The assembly according to claim 2, in which said element of the circumferential frame comprises a foot interposed between at least a part of each sole plate of at least one of the two fishplate elements and the skin of the corresponding fuselage section.

4. The assembly according to claim 1, also comprising a circumferential splice directly attached to said respective skins of said fuselage sections, and to which a part of each sole plate of each of the two fishplate elements is fixed directly attached.

5. The assembly according to claim 1, wherein each of the two fishplate elements comprises a single sole plate that covers two respective contiguous sole plates of two circumferentially consecutive longitudinal stiffeners of the corresponding fuselage section.

6. The assembly according to claim 1, wherein
each of said longitudinal stiffeners comprises two sole plates separated circumferentially from each other and mutually connected by a body of the longitudinal stiffener, and
each of the two fishplate elements comprises two sole plates that are respectively directly attached to said two sole plates of a corresponding longitudinal stiffener and which are connected to each other by said transverse support head of the fishplate element.

7. An aircraft fuselage, comprising at least one assembly according to claim 1.

8. An aircraft comprising a fuselage according to claim 7.

9. The assembly according to claim 1, wherein the respective transverse support heads are directly attached to opposite sides of the circumferential frame by the demountable connecting member.

10. The assembly according to claim 6, wherein the demountable connecting member is a bolt and nut, the bolt passing through orifices in the respective transverse support heads and in the circumferential frame.

11. The assembly according to claim 1, wherein each of the two fishplate elements terminate at the respective transverse support heads.

12. The assembly according to claim 1, wherein each of the two fishplate elements includes a recess to receive a foot of the circumferential frame.

13. A method of assembling two aircraft fuselage sections, each of which comprises a skin and longitudinal stiffeners directly attached to said skin and distributed around a longitudinal axis of said fuselage section, with at least one assembly device for assembling the two aircraft fuselage sections, said device comprising two fishplate elements for fishplating two longitudinal stiffeners substantially aligned with respect to each other and belonging respectively to said fuselage sections, wherein each of the two fishplate elements comprises at least one longitudinal sole plate to be directly attached to a corresponding longitudinal stiffener, and a transverse support head, the two fishplate elements being separated from each other in a longitudinal direction by a circumferential frame, said assembly device also comprising at least one demountable connecting member to mutually clamp the respective support heads of the two fishplate elements to allow a transmission of longitudinal forces between the two fishplate elements, said method comprising at least steps of:
end-to-end positioning, in the longitudinal direction, of the respective skins of said fuselage sections;
directly attaching a sole plate of one of the two fishplate elements to a sole plate of a corresponding longitudinal stiffener of a first one of said fuselage sections;
directly attaching a sole plate of the other of the two fishplate elements to a sole plate of a corresponding longitudinal stiffener of the second of said fuselage sections; and
subsequently to the above three steps, mutual clamping of the respective transverse support heads of the two fishplate elements by means of the at least one demountable connecting member so as to allow longitudinal tension and compression forces to be transmitted between the two fishplate elements.

14. A method according to claim 13, wherein said step of directly attaching the sole plate of the one of the two fishplate elements is implemented before said step of end-to-end positioning of the skins of the fuselage sections.

15. A method according to claim 14, also comprising a step of temporary fixing of the sole plate of the other of the two fishplate elements on the sole plate of said corresponding longitudinal stiffener of the second of said fuselage sections, implemented before said step of end-to-end positioning of the skins of the fuselage sections.

16. A method according to claim 15, also comprising a step of a directly attaching the sole plate of the other of the two fishplate elements on the sole plate of said corresponding longitudinal stiffener of the second of said fuselage sections, after the mutual clamping of the respective transverse support heads of the two fish plate elements.

* * * * *